April 30, 1963  M. WINDEL  3,087,703
GAS COUPLING PLUG COCK
Filed April 19, 1960
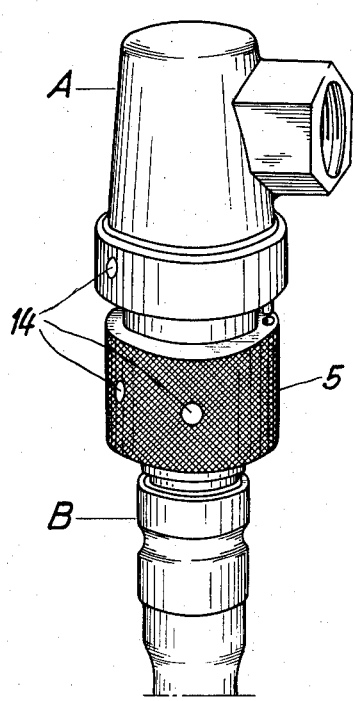
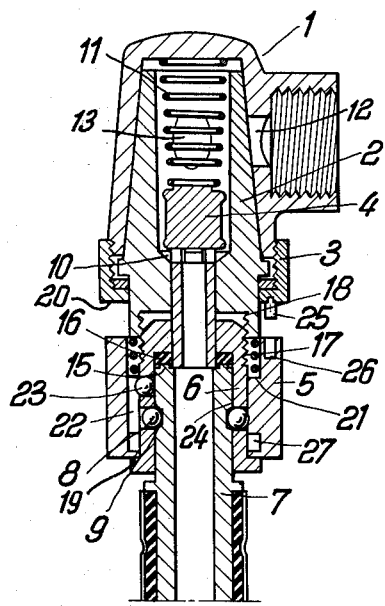
*Inventor:*
Martin Windel
By Lowry & Rinehart
ATTYS

United States Patent Office 3,087,703
Patented Apr. 30, 1963

3,087,703
GAS COUPLING PLUG COCK
Martin Windel, Berlin-Sudende, Germany, assignor to Compagnie Generale des Gaz Liquefies COGEGAL, Societe Anonyme, Paris, France
Filed Apr. 19, 1960, Ser. No. 23,305
Claims priority, application Germany Apr. 28, 1959
3 Claims. (Cl. 251—149.9)

This invention relates to a gas coupling plug cock using an angle cock housing with a longitudinally shiftable coupling member with which a coupling nipple is coordinated for receiving a coupling plug carrying a gas feed hose.

The object of the invention is to provide a gas coupling plug cock in which the gas feed is automatically shut off in the event of the hose becoming detached unintentionally and a turning movement causing undesirable torsion of the coupling plug and the hose is avoided.

The invention provides a gas coupling plug cock which comprises an angle cock housing, a rotary valve head having fluid ports 12 and 13, respectively, an extension on said head, and a freely rotatable and longitudinally shiftable coupling member in the form of a ring on said extension of said valve head, said extension including a coupling nipple accommodated in said coupling ring and connectable to said valve head, a coupling plug carrying a gas feed hose and accommodated in and detachably connectable with said coupling ring, and a locking device between said coupling ring and said coupling plug allowing the axial displacement of said ring only in a predetermined angular position when the cock is closed and positively coupling said nipple with said coupling ring on the introduction of said plug.

Due to this arrangement the coupling plug need not be turned with the hose when the cock is being turned on. Moreover, a check valve, which was hitherto indispensable, can be omitted with the result that the construction of the gas coupling plug cock is not only considerably simplified but its safety factor is also increased in that it is ensured in a simple manner that the introduction of the coupling plug is only possible when the valve head in the angle cock housing is in closed state. Such a gas coupling plug cock constructed like an electric plug is suitable for many purposes, including for example the connection of a gas refrigerator or the like.

According to another proposal of the invention, a ball locking device is provided for positively coupling the coupling plug with the coupling nipple and securing against unintentional turning of the valve head in the angle cock housing.

Another particularly important precautionary measure consists, for example, in that the coupling plug is slidable in any direction on or in a gasket so that, on the opening and closing of the gas coupling plug cock by means of the coupling ring, the coupling plug as well as the hose is not subjected to any torsion.

A preferred embodiment of the invention will now be described by way of example and with reference to the accompanying drawing, in which FIG. 1 is a perspective view showing a gas coupling plug cock and a hose connected thereto, and FIG. 2 is a central longitudinal section therethrough.

FIGS. 1 and 2 show a gas coupling plug cock generally designated by A and a hose B connected thereto. The gas coupling plug cock A comprises an angle cock housing 1 in which a valve head 2 is introduced which is held in position by means of a screw ring 3 in which a stop pin 25 is fitted. This stop pin 25 engages in a recess or bore 26 in a freely rotatable spring supported coupling ring 5 when this ring is pressed up by hand. Due to this the coupling ring 5 can be coupled with a coupling nipple 6 which is detachably connectable with a coupling plug 7, by axial displacement only in a predetermined position with the cock closed, this nipple 6 being thus positively coupled with the coupling ring 5 on the introduction of the coupling plug 7.

An internal collar or flange 21 in the coupling ring 5 is provided with one or more milled recesses or grooves 22 in which a corresponding number of locking elements or balls 23 accommodated in the wall of the coupling nipple 6 can engage. Also fitted in the coupling nipple 6 which is provided with an external screw thread 17 and a gasket 16, is a number of balls 8 engaging in corresponding recesses 9 in the coupling plug 7 for the purpose of locking the same. The lower part of the valve head 2 has an internal screw thread 18 and the coupling nipple 6 is screwed into the valve head 2 through the intermediary of the screw threads 17 and 18.

The introduction of the coupling plug 7 into the coupling nipple 6 is therefore only possible when the coupling ring 5 is pressed up to allow the balls 8 to move outwards into an internal groove 27 in the coupling ring 5 and the ball 23 to be pressed outwards into the groove 22. The pressing up of the coupling ring 5 can however only be carried out in a position in which the pin 25 of the ring 3 engages the bore 26. A shoulder 19 on the coupling nipple 6 and the end 20 of the screw ring 3 define spaced stop means limiting the axial displacement of the ring 5.

Therefore the coupling ring 5 cannot be pushed up in just any position because this is prevented by the pin 25 of the ring 3. In order to facilitate the adjustment of the coupling ring 5 with respect to the angle cock housing 1, markings 14 of any desired shape may be provided on the screw ring 3 and the coupling ring 5, as shown in FIG. 1.

If, as above explained, the coupling plug 7 is introduced into the coupling nipple 6 and the coupling ring 5 again moved downwards, the balls 8 in the coupling nipple 6 are forced into the recesses 9 in the coupling plug 7. As a result the coupling plug 7 is pressed tightly on to the gasket 16. The ball 23 remains in the groove 22 in this position and serves for securing the cone 2 against turning. To improve the sealing action between the gasket 16 and the coupling plug 7, the latter is formed at its upper face with an axially extending annular projection 15 of a wall thickness smaller than that of the remaining part of the coupling plug 7.

As the coupling plug 7 can only be introduced when the valve head 2 is in closing position, the disengagement thereof is also only possible when the cock is closed. This is attained in that the coupling ring 5 can only be pressed upwards when the pin 25 engages in the bore 26 and the ball 23 is situated in the groove 22.

If the hose B is detached, the coupling ring 5 can be turned as far as desired to the right or to the left without any turning movement of the closing valve head 2 being possible. The locking of the ball 23 in the groove 21 is effected by the fact that the ball 23 is pressed into the groove 22 on the insertion of the plug 7 and the external diameter of part 24 of the coupling plug 7, particularly that directed towards the hose, is correspondingly chosen. On the pulling out of the plug 7, the ball 23 will be pressed inwards on the coupling ring 5 being turned to the right or left, with the result that the locking is released.

FIG. 2 shows a check valve 4 with a spring 11 and seat 10. This check valve, however, is not absolutely necessary in practice and can be omitted.

To sum up, therefore, the following measures or functions are characteristic for the invention;

The coupling plug 7 can only be introduced when the cock is in closed state.

The plug 7 can be removed also only when the cock is in closed state.

A number of balls 8 are pressed into horizontal recesses by actuating the coupling ring 5, thereby producing a gas-tight connection by the gasket 16 consisting of rubber or plastic.

The coupling plug 7 is slidable in any direction on or in the gasket so that, on the gas coupling plug cock being opened or closed by means of the coupling ring 5, no torsion of the plug 7 with the hose B coordinated with the gas coupling plug cock occurs.

For the turning movement for opening and closing the cock, one or several balls 23 is or are provided in a plane different from that of the balls 8 and which is or are pressed into one or more vertical recesses for arresting the coupling ring 5. The coupling ring 5 can be turned as desired to the right or left without performing any function when the plug is removed.

For introducing the coupling plug 7, the coupling ring 5 must be so set that a mark indicating the "off" position of the cock, is in the "off" position.

When the cock is in an intermediate position, that is in the case of the cock being half or quarter open or closed, it is impossible to disengage the plug.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A gas coupling comprising a housing having a first fluid port, a rotary valve head in said housing having a second fluid port movable into and out of registry with said first fluid port, an extension rigidly connected on said valve head having a through fluid passage therein, said passage having one end open and the other end communicating with said second port, a member slidably and rotatably mounted on said extension for axial displacement between a locking position and an unlocking position, a coupling plug receivable in the open end of said fluid passage, means on said extension for locking and holding said plug when said member is in locking position, means permitting axial displacement of said member to unlocking position only when said valve head has been rotated to move said ports out of registry and clutch means associated with said extension for interlocking said member with said valve head when said plug is inserted in said open end and freeing said member for rotation on said extension when said plug is removed, whereby the sleeve member is free to rotate relative to the extension when said plug is removed.

2. A gas coupling as set forth in claim 1 wherein said clutch means includes a recess in said member, movable locking means on said extension engageable with said recess and blocking means on said plug, said blocking means holding said locking means in said recess when said plug is inserted in said open end.

3. A gas coupling as set forth in claim 1 wherein said clutch means includes a first recess in said member, a second and opposed recess in said extension, said second recess opening to said bore, and a movable locking element in said second recess normally forced into said first recess by said plug, said locking element being free to move out of said first recess when said plug is removed.

References Cited in the file of this patent

UNITED STATES PATENTS

| 1,240,161 | Olds | Sept. 11, 1917 |
| 2,188,308 | Pearson et al. | Jan. 30, 1940 |
| 2,457,251 | Main | Dec. 28, 1948 |
| 2,665,928 | Omon et al. | Jan. 12, 1954 |
| 2,935,338 | Mills | May 3, 1960 |

FOREIGN PATENTS

| 441,337 | Great Britain | Jan. 13, 1936 |